United States Patent [19] [11] 4,035,811
Paranjpe [45] July 12, 1977

[54] INK JET RECORDER AND CATCHER THEREFOR
[75] Inventor: Suresh C. Paranjpe, Xenia, Ohio
[73] Assignee: The Mead Corporation, Dayton, Ohio
[21] Appl. No.: 704,568
[22] Filed: July 12, 1976
[51] Int. Cl.² .................................. G01D 15/18
[52] U.S. Cl. .............. 346/75; 346/140 R
[58] Field of Search ............................ 346/75, 140

[56] References Cited
U.S. PATENT DOCUMENTS

| | | | |
|---|---|---|---|
| 3,701,998 | 10/1972 | Mathis | 346/75 |
| 3,777,307 | 12/1973 | Duffield | 346/75 |
| 3,813,675 | 5/1974 | Steffy et al. | 346/140 X |
| 3,836,914 | 9/1974 | Duffield | 346/75 |
| 3,893,623 | 7/1975 | Toupin | 346/75 X |
| 3,936,135 | 2/1976 | Duffield | 346/75 X |

Primary Examiner—George H. Miller, Jr.
Attorney, Agent, or Firm—Biebel, French & Nauman

[57] ABSTRACT

An ink jet recorder for printing on a moving print web has a means for generating a plurality of parallel streams of selectively charged ink drops. These streams descend downwardly toward the moving print web and pass through a deflecting field. A catcher is provided for catching the drops reflected by the field and ingesting the drops. The catcher includes a substantially vertical drop catching surface and an upwardly extending drop ingesting opening defined in part by a curved surface at the bottom of the drop catching surface. With such a catcher configuration, drops will flow down the drop catching surface and then upwardly through the opening. A bottom plate extending along the bottom of the catcher and defining, with the curved surface, the drop ingesting opening may be formed from a porous material.

4 Claims, 8 Drawing Figures

INK JET RECORDER AND CATCHER THEREFOR

BACKGROUND OF THE INVENTION

The present invention relates to ink jet recorders and more particularly to an ink jet recorder having an improved means for catching the portion of the ink drops which are not intended to strike the print web. Ink jet recorders are shown generally in U.S. Pat. No. 3,373,437, issued Mar. 12, 1968 to Sweet et al; U.S. Pat No. 3,586,907 issued June 22, 1971 to Beam et al; and U.S. Pat. No. 3,701,998 issued Oct. 31, 1972 to Mathis.

The ink jets in such recorders are created by forcing a supply of recording fluid from a manifold through a series of orifices in an orifice plate. The orifice plate is mechanically stimulated so that the jets break up into streams of uniformly sized and regularly spaced drops. Each stream of drops is formed in proximity to an associated charging electrode which induces electrical charges in selected ones of the drops as they are formed. The streams of drops then fall toward the moving print web.

Only selected ones of the drops are intended to strike the web, however, and an electrical deflection field is provided in the path of the drops in order to cause the charged and uncharged drops to diverge into two separate trajectories. The drops in one set of trajectories may be caught by suitable apparatus and, therefore, prevented from printing. In order to conserve on the amount of ink used in the printing process, the caught drops are filtered and then recirculated back to an ink reservoir for later use in printing. The drops in the other trajectory are not caught, however, and therefore strike the print web. Printing with charged drops requires precise deflection of the drops to their ultimate print positions on the print web, and therefore drop size and the charge level on the drops are critical. A number of prior art systems have avoided these problems to an extent by using the uncharged drops for printing, while catching and recirculating the charged drops.

It will be appreciated that the means by which the deflected drops are caught and prevented from striking the print web is critical in the operation of the printer. A number of approaches have been taken to insure that the drops are effectively caught.

In U.S. Pat. No. 3,373,437 to Sweet et al, issued Mar. 12, 1968, a catcher mechanism is shown in which a porous catcher surface is positioned parallel to the drop streams. Deflected drops strike the porous surface and are ingested into a central cavity which is maintained under at least a partial vacuum. One difficulty with such a porous catcher is that drops striking the porous surface tend to splatter with the result that droplets of ink may strike the web and degrade the quality of the printed image.

Catchers of the type shown in U.S. Pat. No. 3,701,998 to Mathis, issued Oct. 31, 1972 have been somewhat more successful. The catchers used in the Mathis device each have a smooth, vertical catching surface formed of a nonporous material. A slot adjacent to the bottom edge of the catching surface provides an access to an interior, pressure evacuated cavity into which the drops are ingested, after striking the catching surface.

Although functioning in a manner superior to the catchers of Sweet et al, supra, the Mathis catchers are somewhat disadvantageous in that the air flow through the ink ingesting slot may cause air turbulence in the path of the undeflected drops and thus alter the points at which the drops strike the print web. This turbulence may also attract dirt particles which may lodge between the catcher and an adjacent deflection field electrode, thus shorting out the electrode.

Additionally this type of catcher has a relatively large vertical dimension and, as a result, the jet orifices and charge rings are constrained to be positioned well above the moving web. Although the jet orifices are manufactured to exacting tolerances, it will be appreciated that it is not possible to make these orifices precisely vertical. As a result, there will necessarily be a slight skew in many of the jets such that the drops formed from these jets will not strike the web at precisely the desired position. The further orifices are positioned from the print web, the more noticeable these errors will become. Other catchers having similar limitations are shown in U.S. Pat. Nos. 3,836,914, issued Sept. 17, 1974 to Duffield; and U.S. Pat. No. 3,813,675, issued May 28, 1974 to Steffy et al.

Another type of catcher arrangement is shown in U.S. Pat. No. 3,936,135, issued Feb. 3, 1976 to Duffield. This catcher mechanism is generally similar to the Mathis catcher described above. The central cavity in this catcher is, however, filled with conductive ink which is removed at a rate approximating that at which the ink is deposited on the catching surface. The result of this is that the ink completely fills the ingesting slot and forms a miniscus at that point. There is no air flow into the catcher and, therefore, air disturbances and the resulting print image degradation are minimized. This catcher configuration is, however, capable of handling only moderate ink flow rates. Additionally this catcher, like many prior art catchers, accentuates the errors resulting from orifice skew.

A need, therefore, exists for a relatively thin catcher mechanism which will allow the jet forming orifices to be positioned near the moving print web and which will create only a minimal air disturbance in the path of the drops to be printed.

SUMMARY OF THE INVENTION

An ink jet recorder has a means for generating a plurality of parallel streams of selectively charged ink drops which descend toward a moving print web. A means for generating a deflecting field is positioned intermediate the means for generating the plurality of streams and the moving web. Catcher means are positioned for catching the drops deflected by the field and ingesting the drops. The catcher means includes a substantially vertical drop catching surface and an upwardly extending drop ingesting opening defined by a curved surface at the bottom of the drop catching surface such that drops caught by the catcher means will flow down the catching surface and then upwardly through the opening and be ingested.

Accordingly it is an object of the present invention to provide a relatively thin catcher for an ink jet recorder such that the ink drops are generated close to the print web and errors resulting from jet skew are minimized; and to provide such a recorder in which air turbulence affecting ink drop trajectory is minimized.

Other objects and advantages of the invention will be apparent from the following description, the accompanying drawings and the appended claims.

DESCRIPTION OF THE PREFERRED EMBODIMENTS

Figure 1:
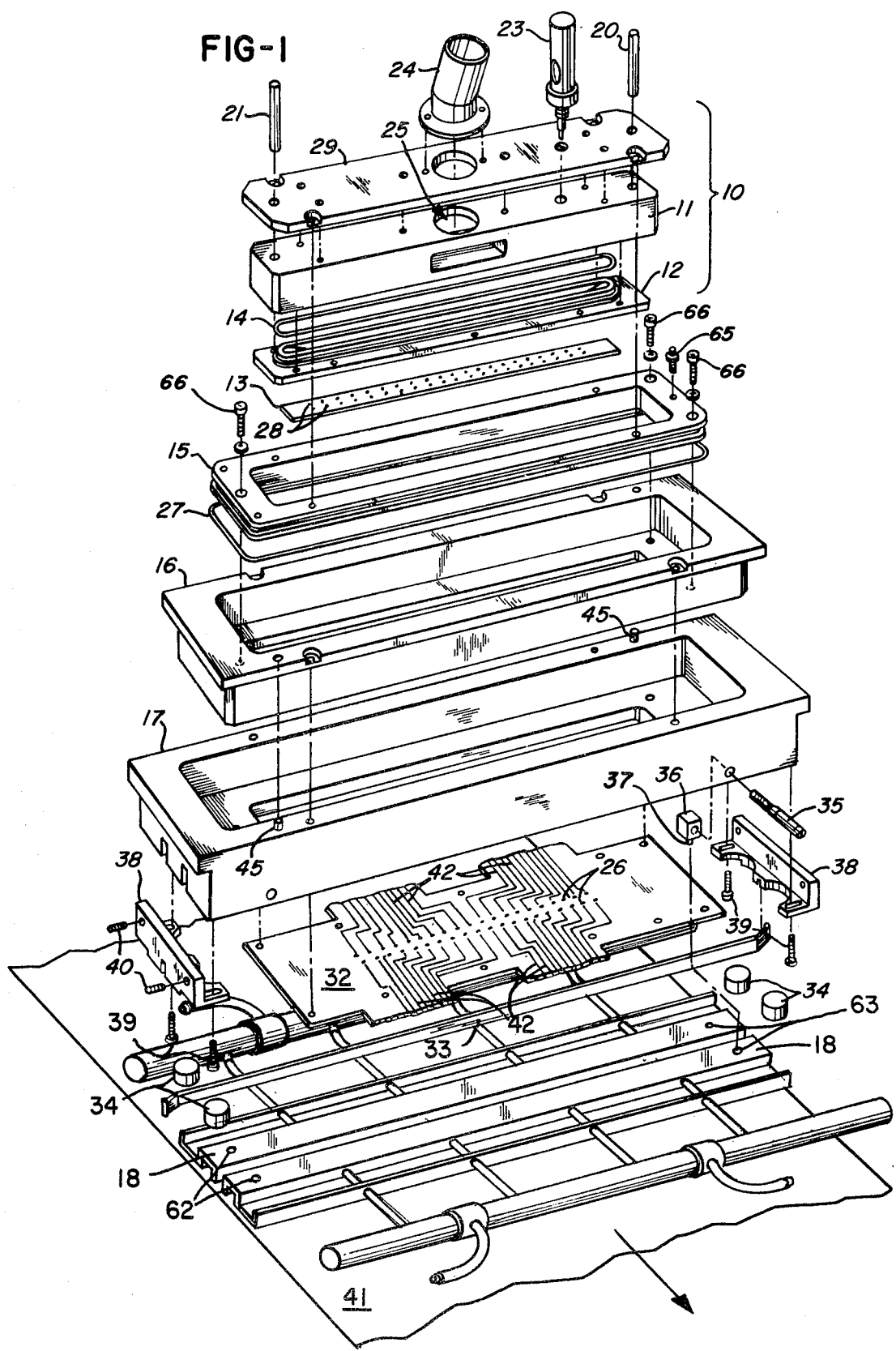
FIG. 1 is an exploded perspective view showing the ink jet recorder and catcher of the present invention.

A preferred embodiment of the invention as incorporated into a jet drop recording head is illustrated in FIG. 1. The complete head includes a manifold subassembly 10 which fits into a wobble plate 15. Wobble plate 15 fits into an inner yoke 16 which in turn fits within a main yoke 17. This apparatus, along with charge ring plate 32, constitutes a means for generating a plurality of parallel streams of selectively charged ink drops, said streams descending downwardly toward moving print web 41. A deflection ribbon 33 may have a potential applied to it such that it acts as a means for generating a deflection field through which the drops will pass. A pair of catchers 18 are provided for catching the drops which are deflected by the field.

Manifold subassembly 10 comprises a manifold bar 11, a cover plate 29, an orifice plate holder 12, and an orifice plate 13 which fit together as illustrated in FIG. 1. Thus orifice plate holder 12 fits upwardly into a cavity in the lower surface of manifold bar 11. Orifice plate holder 12 may be secured in place by screws (not shown) and a fluid tight seal is provided between orifice plate holder 12 and manifold bar 11 by an O-ring 14. Orifice plate 13 is preferably soldered in place against the lower surface of orifice plate holder 12. Manifold subassembly 10 is thus an integral unit which may be assembled and flushed clean prior to any association with any of the electrical components of the recording head.

As further illustrated in FIG. 1, manifold bar 11 and cover plate 29 are provided with internal passages into which may be inserted an ink supply tube 20, an ink return tube 21, a stimulator 23, and an air tube fitting 24. Stimulator 23 has a probe which reaches downwardly for contact with orifice plate 13. Orifice plate 13 is excited to propagate a series of traveling bending waves as described in detail in Lyon et al, U.S. Pat. No. 3,739,393, and stimulator 23 is rotatably adjustable as described in Houser, U.S. Pat. No. 3,701,476. Air tube fitting 24 is used for applying a flow of purging air to the recording head. A flow of air supplied by a fan or other means (not shown) flows downwardly through air tube fitting 24 and thence into an air cavity 25 in manifold bar 11. The purging air then follows a path around orifice plate 13 to exit the recording head through charge ring apertures 26 in charge ring plate 32. This keeps foreign matter out of the charge ring apertures and also provides a stabilizing effect for the liquid jets. The jet stabilizing effect, which forms no part of this invention, is described in Sweet U.S. Pat. No. 3,596,275.

Once assembled, manifold subassembly 10 is fitted downwardly into wobble plate 15 and fastened thereto as by screws (not shown). Wobble plate 15, with manifold subassembly 10 attached thereto, is fitted downwardly into inner yoke 16 with an O-ring 27 therebetween. It will be appreciated that wobble plate 15 may be adjusted upwardly or downwardly or tilted within inner yoke 16 for adjustment of jet filament lengths to meet requirements as discussed in U.S. Pat. No. 3,739,393. For this purpose there are provided three lifting screws 65 and three hold down screws 66.

Independently of the assembly of manifold subassembly 10, the electrical elements of the recording head may be assembled as a unit by fastening to main yoke 17 as illustrated also in FIG. 1. Charge ring plate 32 is attached directly to the main yoke 17, as are also catchers 18. Charge ring plate 32 is fastened in place by a series of screws, and catchers 18 are secured by means of four cylindrical magnets 34 which are bonded into recesses in the lower surface of main yoke 17. Magnets 34 are common insulated ceramic magnets which are commercially available from many sources. Preferably magnets 34 are made of barium-ferrite ceramic embedded in insulating plastic and are provided with lead-out pole pieces. Catchers 18 are preferably fabricated, at least in part, from a magnetic stainless steel material so that they are firmly grasped by magnets 34.

Lateral adjustment of catchers 18 is provided by set screws 35 and adjusting nuts 36. Each adjusting nut 36 is provided with a small downwardly projecting pin 37 which reaches into a mating recess 62 or 63 in the associated catcher 18. Set screws 35 reach through openings in yoke 17 for threaded engagement with nuts 36. Thus catchers 18 may be adjusted inwardly or outwardly to provide any desired spacing between the catcher faces and the surfaces of deflection ribbon 33.

Deflection ribbon 33 is stretched between a pair of tension blocks 38 which in turn are fastened to main yoke 17 as by screws 39. Tension blocks 38 are provided with set screws 40 so that the tension blocks may be adjusted back and forth in the longitudinal direction. Set screws 40 are initially adjusted to enable easy insertion of deflection ribbon 33 between tension blocks 38. Thereafter deflection ribbon 33 is drawn to a taut condition.

In operation catchers 18 are connected to a common electrical potential source, and deflection ribbon 33 is connected to a source of different electrical potential, so that there are set up a pair of oppositely directed static electrical fields between deflection ribbon 33 and catchers 18. Droplets of recording liquid which are to be caught are impressed with an electrical charge during the formation thereof and thus are deflected away from ribbon 33 during their transit through the above mentioned electrical fields. This deflection of the charged droplets causes them to impact against one or the other of catchers such that they will not print upon web 41.

Figure 2:
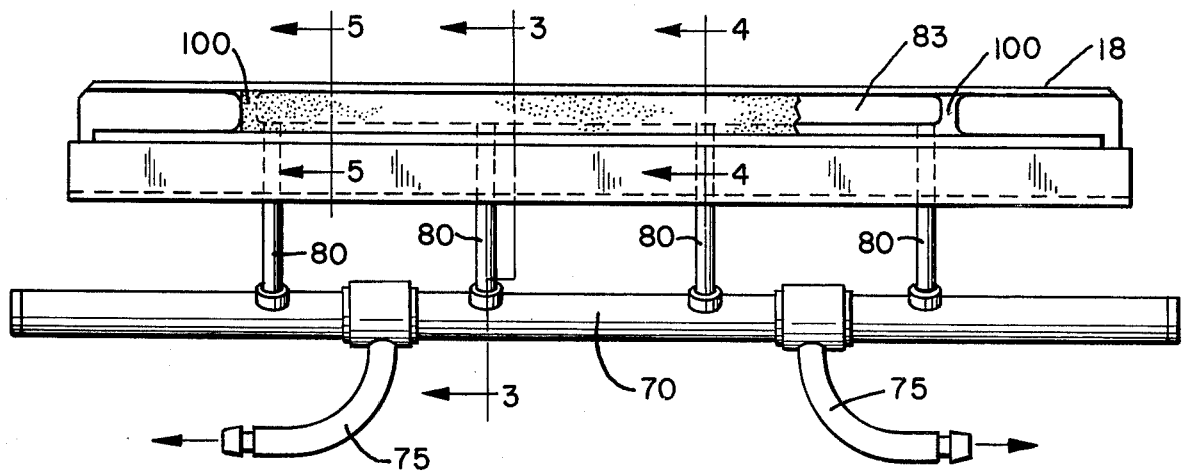
FIG. 2 is a view of a portion of the catcher with parts broken away, as it would appear looking up from the print web.
Figure 3:
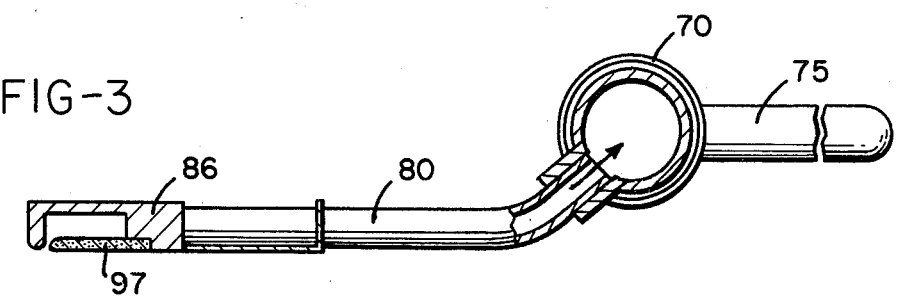
FIG. 3 is a sectional view taken generally along the line 3—3 in FIG. 2.
Figure 4:
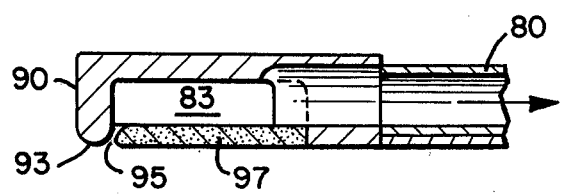
FIG. 4 is a sectional view taken generally along the line 4—4 in FIG. 2.
Figure 5:
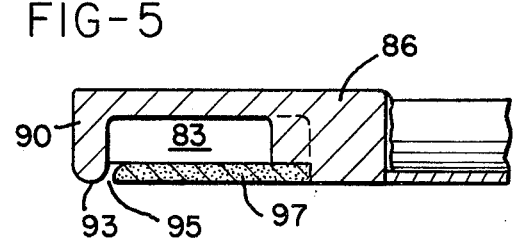
FIG. 5 is a sectional view taken generally along line 5—5 in FIG. 2.

Referring now to FIG. 2, a portion of the catcher mechanism of the present invention is shown as seen from below. A vacuum manifold 70 is connected to vacuum lines 75 and evacuation tubes 80. Catcher 18 defines a central pressure evacuated cavity 83 which is maintained at a partial vacuum. As shown in FIGS. 3 and 4, the evacuation tubes 80 continually remove air and ink from cavity 83. As seen in FIG. 5, the catcher includes a catcher body 86 having a substantially vertical drop catching surface 90 which is positioned vertically in the ink jet recorder of the present invention. Along the bottom of the drop catching surface 90 is a curved, drop attracting surface 93. A drop ingesting opening 95 in the bottom of the catcher adjacent surface 93 communicates with cavity 83. It is significant that opening 95 extends upwardly into cavity 83.

A bottom plate 97 extends along the bottom of the catcher 18 and defines, with the drop attracting surface 93, drop ingesting opening 95. As seen in FIG. 2, plate 97 runs the length of catcher 18 between webs 100 such that the cavity 83 is substantially closed except for opening 95. Plate 97 may advantageously be formed of a porous material such that stray droplets of ink may be ingested through the plate.

Figure 6:
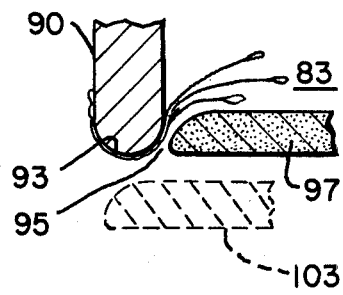
FIG. 6 is an enlarged portion of the catcher shown in FIGS. 3–5 illustrating the ink flow into the catcher.

FIG. 6 illustrates the manner in which the catcher mechanism of the present invention operates. Drops which strike surface 90 tend to run down the surface and onto catcher drop attracting surface 93. Ink will then be drawn upwardly into cavity 83 by the air being sucked into opening 95. In the catcher configuration of FIG. 6, opening 95 extends upwardly into the catcher and thus the movement of air into opening 95 will have negligible effect upon the undeflected drops which pass the catcher in a trajectory parallel to surface 90.

The catcher shown in FIG. 6 has the additional advantage that, since opening 95 is provided in the bottom of the catcher rather than along the front catching surface, the height of the catcher is substantially reduced. If plate 97 were moved into the position shown by dashed lines 103 to provide for an ink ingesting opening along the front of the catcher, it is apparent that the catcher would have a considerably greater vertical dimension while presenting only the same catching surface 90 to perform the drop catching function.

Another advantage stemming from the configuration of FIG. 6 is that there is less likelihood that dirt and paper dust will cause a short between the catcher and the adjacent charged deflection ribbon 33 (FIG. 1). This is due, at least in part, to the fact that the ink ingesting opening of this catcher is farther away from the deflection ribbon and air movement in the region of the deflection ribbon and the amount of dust carried thereby will be reduced.

Figure 7:
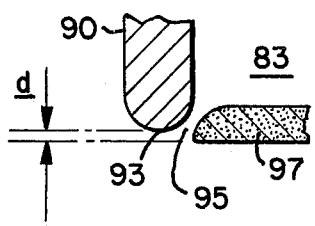
FIG. 7 is a view similar to FIG. 6 of alternative embodiment of the invention.

Reference is now made to FIG. 7 in which an alternative embodiment of the present invention is shown. In this embodiment, the bottom of plate 97 is lower than the lowest point on surface 93 by a distance, $d$, which may be on the order of 0.005 – 0.010 inches. It should be noted that opening 95 which communicates with cavity 83 is still an upwardly extending opening. The embodiment shown in FIG. 7 has many of the same advantages of the embodiment of FIG. 6. Additionally, it should be noted that the ink which is ingested by the catcher of FIG. 7 will not be required to travel as far upward through opening 95 to reach cavity 83, and therefore, it may be possible to reduce the partial vacuum that is needed for a successful catcher operation. A reduction in vacuum will, of course, advantageously reduce the air turbulence adjacent the catcher.

Figure 8:
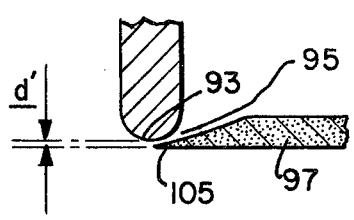
FIG. 8 is a view similar to FIG. 6 of another alternative embodiment of the invention.

Another alternative embodiment of the present invention is shown in FIG. 8. This embodiment is very similar to that shown in FIG. 7 in that plate 97 is positioned somewhat below the lowest point of surface 93. This distance, $d'$, may be on the order of 0.006 inches. Opening 95 in this embodiment is an upwardly extending opening. In this embodiment, the ink which is ingested will be required to flow more gradually upward into the catcher. The sharpening of the forward edge 105 of plate 97 reduces the angle of upward flow so required.

While the forms of apparatus herein described constitute preferred embodiments of the invention, it is to be understood that the invention is not limited to these precise forms of apparatus, and that changes may be made therein without departing from the scope of the invention.

What is claimed is:

1. In an ink jet recorder for printing on a moving web, said recorder comprising means for generating a stream of selectively charged ink drops, means for generating a drop deflecting field for deflecting the charged drops in said drop stream into a deflected trajectory and for allowing the uncharged drops in said drop stream to pass in an undeflected trajectory, and means for catching the drops in said deflected trajectory including a central cavity and means for maintaining a partial vacuum in said central cavity, the improvement in said means for catching comprising:
a flat drop catching surface positioned parallel to said undeflected trajectory, a curved surface along the bottom edge of said drop catching surface, and means defining an upwardly extending ink ingesting slot in the bottom of said catcher communicating with said cavity such that drops strike said catching surface, run down said catching surface and onto said curved surface, and upwardly therefrom into said slot, whereby the height of said surface is minimized and the trajectory of said undeflected drops is substantially unaffected by ingestion of ink into said means for catching.

2. An ink jet recorder comprising:
a means for generating a plurality of parallel streams of selectively charged ink drops, said streams descending downwardly toward a moving print web,
means for generating a deflecting field intermediate said means for generating a plurality of parallel streams and said moving web such that said streams will pass therethrough, and
catcher means for catching the drops deflected by said field and ingesting the drops so caught including a flat substantially vertical drop catching surface and an upwardly extending, drop ingesting opening defined by a curved surface at the bottom of said drop catching surface such that drops will flow down said drop catching surface and then upwardly through said opening and be ingested.

3. A catcher for use in an ink jet recorder for catching deflected drops and preventing said drops from striking a moving print web beneath said catcher comprising:
catcher body means defining a central, pressure evacuated cavity,
a drop catching surface vertically aligned on the exterior of said body,
a curved, drop attracting surface positioned along the bottom edge of said drop catching surface, and
a bottom plate extending along the bottom of said catcher and defining, with said drop attracting surface, a drop ingesting opening in the bottom of said catcher, said bottom plate positioned such that said opening extends upwardly.

4. The catcher of claim 3 in which said bottom plate is formed from a porous material.

* * * * *